United States Patent [19]

Yoshimaru et al.

[11] Patent Number: 4,888,751
[45] Date of Patent: Dec. 19, 1989

[54] IMAGE INFORMATION PROCESSING APPARATUS

[75] Inventors: Tomohisa Yoshimaru, Yokohama; Seinosuke Kajitani, Sagamihara, both of Japan

[73] Assignee: Kabushiki Kaisha Toshiba, Kawasaki, Japan

[21] Appl. No.: 240,447

[22] Filed: Sep. 2, 1988

Related U.S. Application Data

[60] Continuation of Ser. No. 85,752, Aug. 17, 1987, abandoned, which is a division of Ser. No. 858,647, May 2, 1986, abandoned.

[30] Foreign Application Priority Data

May 16, 1985 [JP] Japan .................................. 60-104403
May 16, 1985 [JP] Japan .................................. 60-104426

[51] Int. Cl.$^4$ ........................ G11B 7/08; G11B 17/22; G11B 17/30
[52] U.S. Cl. .................................. 369/36; 360/98.01; 369/39; 369/199
[58] Field of Search ............... 369/33, 34, 36, 37, 369/38, 39, 195, 199; 360/98.01

[56] References Cited

U.S. PATENT DOCUMENTS

| | | | |
|---|---|---|---|
| 2,994,856 | 8/1961 | Dickinson | 369/34 |
| 4,387,452 | 6/1983 | Bricot et al. | 369/32 |
| 4,402,025 | 8/1983 | Anderson et al. | 360/98 |
| 4,423,448 | 12/1983 | Frandsen | 360/98 |
| 4,566,087 | 1/1986 | Kraft | 369/36 |
| 4,577,240 | 3/1986 | Hedberg et al. | 360/98 |
| 4,644,515 | 2/1987 | Allebest et al. | 369/36 |
| 4,675,755 | 6/1987 | Baumeister et al. | 369/36 |

OTHER PUBLICATIONS

*Data Processing System*, IBM Technical Disclosure Bulletin, vol. 3, No. 5, Oct. 1960, Bowlde, pp. 24-25.
Architektur und Organisation Digitaler Rechenanlagen, Leitfaden der Angewandten Informatik, Universitat Dortmund, B. G. Teubner Stuttgart 1978, West Germany.
Computer Design, Apr. 1984, "Intelligent Disk Drives Simplify System Integration", by Richard Freedland, (Special Report on Disk Memory).

*Primary Examiner*—Steven L. Stephan
*Attorney, Agent, or Firm*—Oblon, Spivak, McClelland, Maier & Neustadt

[57] ABSTRACT

An image information processing apparatus comprises a rotational shaft for supporting five optical disks, subjected to read or write access, at predetermined intervals along its central axis, and two optical units, each having an optical head rotatable through 180 degrees to allow scanning of positions separated by 180 degrees. The optical heads are moved along the central axis of the rotatable shaft and in a radial direction of the optical disk between a scanning position where the optical disk can be scanned, and into a non-scanning position where the optical disk cannot be scanned. Thus the optical heads are moved to face different positions on the same optical disk or different optical disks.

15 Claims, 10 Drawing Sheets

IMAGE INFORMATION PROCESSING APPARATUS

This application is a continuation of application Ser. No. 085,752, filed on Aug. 17, 1987, now abandoned, which is a division of application Ser. No. 858,647, filed May 2, 1986, now abandoned.

BACKGROUND OF THE INVENTION

The present invention relates to an image information processing apparatus using an information recording medium such as an optical memory.

Image information processing apparatuses using recording media such as optical memories have become more popular than the conventional magnetic memory in recent years, for the following reasons. The storage capacity of an optical memory is much larger than that of a magnetic disk memory. The optical image information processing apparatus is also substantially noise-free, providing a stable image reproduction, as well as being free from external influences, thus stably operating over a long period of time. In addition, access to a recording area can be achieved in a noncontact manner, so that the recording medium and the scanning reading/writing head are free from mechanical damage.

The development of image information processing apparatuses, each using a plurality of optical memories, is progressing to process more information.

In a conventional image information processing apparatus of this type, an auto changer sets optical disks (as the information recording media) one at a time to perform information processing. The conventional image information processing apparatus with an auto changer system, which is disclosed in U.S. patent application Ser. No. 735,066 filed by the present assignee on May 17, 1985, is complicated and bulky, and requires a relatively long waiting time.

SUMMARY OF THE INVENTION

The object of the present invention is to provide an image information processing apparatus, wherein a bulky device such as an auto changer need not be used, access to a plurality of optical memories can be achieved in a short period of time using a relatively simple and compact arrangement, and the optical memories can be easily handled.

DETAILED DESCRIPTION OF THE PREFERRED EMBODIMENT

An image information processing apparatus according to an embodiment of the present invention will be described with reference to the accompanying drawings.

Figure 1:
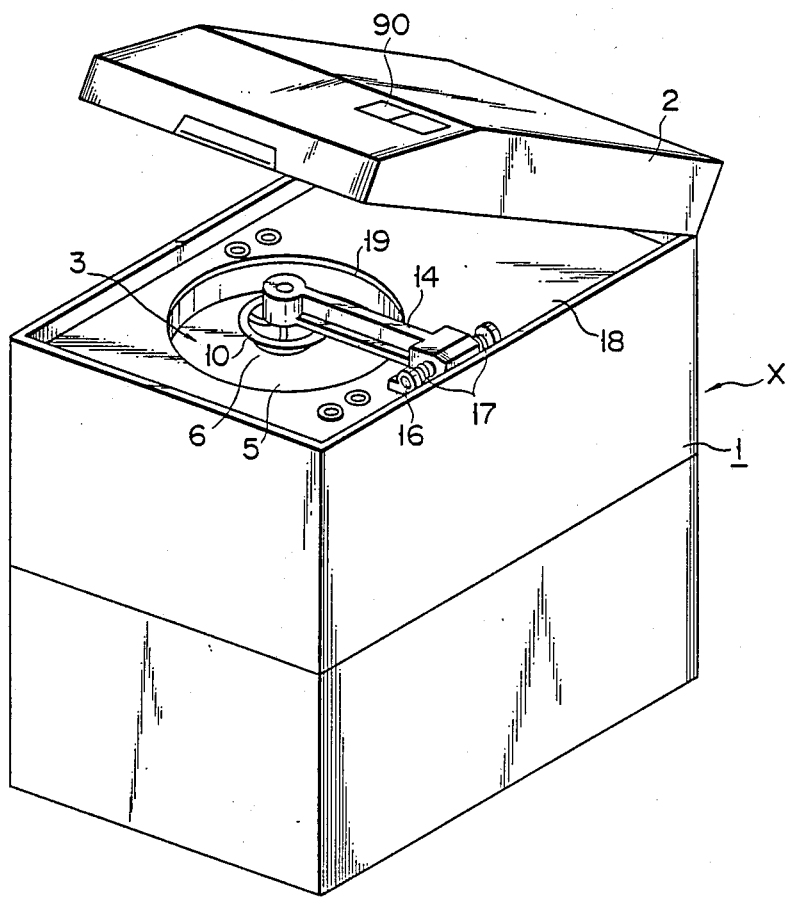
FIG. 1 is a perspective view showing an image information processing apparatus according to an embodiment of the present invention.

FIG. 1 shows image information processing apparatus X. Apparatus X has a housing 1 having upper cover 2. Cover 2 can be opened or closed. Optical disk handling mechanism 3 and controllers (to be described later) are arranged in housing 1.

Figure 2:
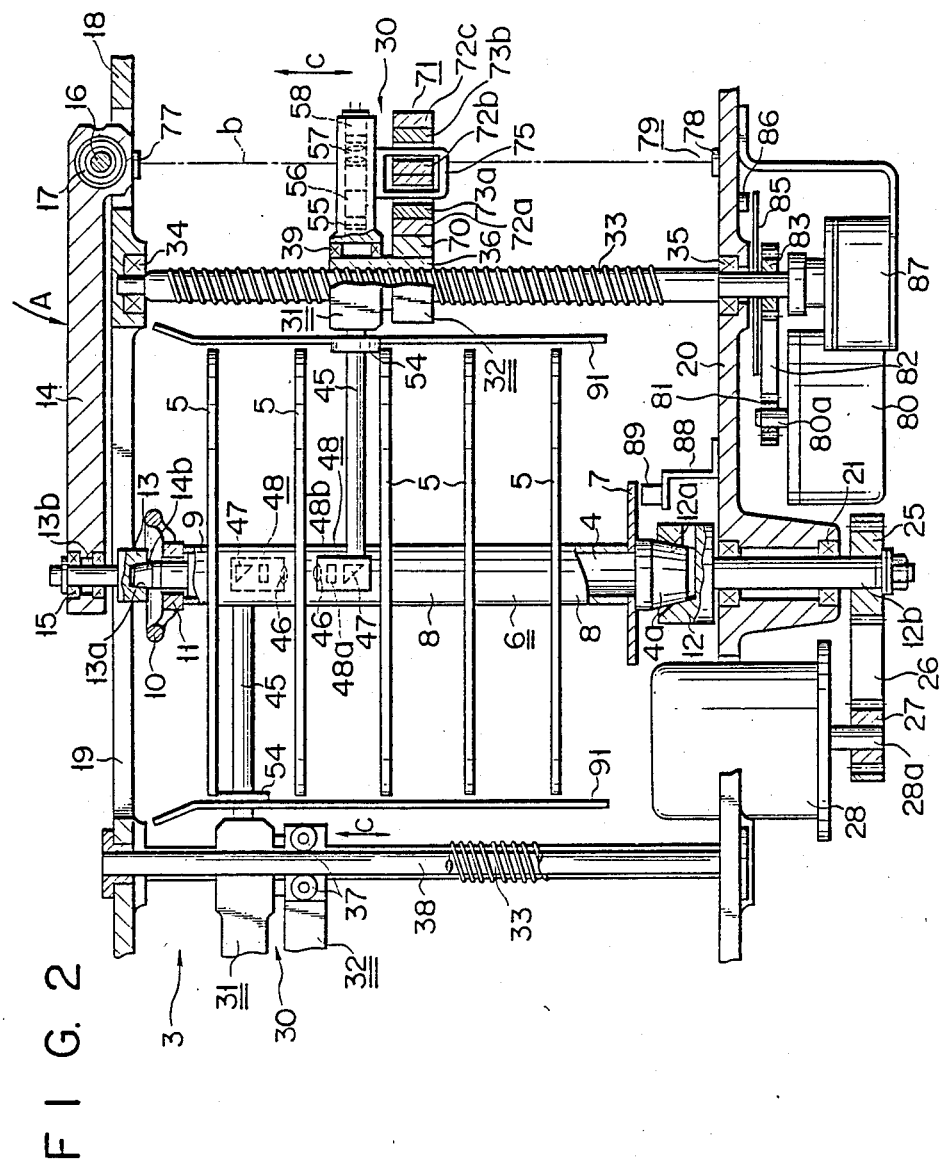
FIG. 2 is a partially cutaway side view schematically showing an arrangement of a disk handling mechanism in the apparatus of FIG. 1.

Mechanism 3 comprises recording medium unit 6 as shown in FIG. 2. A plurality of optical memories 5 (five disks in FIG. 2) are coaxially mounted on vertical drive shaft 4, and are spaced apart by a predetermined distance. Unit 6 is rotated about a central axis of shaft 4 to perform information processing (i.e., read/write access to recording area) of selected optical disk 5.

Timing disk 7 is coaxially mounted on shaft 4, and five collars (fastening means) 8 and disks 5 are alternately mounted on shaft 4 at equal intervals. An upper collar 9 is mounted on uppermost disk 5 and nut 11, integral with handle 10, is threadably engaged with the upper end portion of shaft 4. Members 5, 7 and 8 are rotated together with shaft 4, forming unit 6.

Lower and upper end portions 4a and 4b of shaft 4, both provided in unit 6, are tapered. Lower end portion 4a is fitted in tapered hole or recess 12a of lower press member 12, and upper end portion 4b is inserted in tapered hole or recess 13a of upper press member 13, thereby preventing vertical movement of shaft 4 but allowing its rotation. The taper at the lower end portion of shaft 4 is slightly larger than that at the upper end portion thereof.

Press member 13 for holding the upper end portion of shaft 4 is rotatably supported by bearing 15. Support shaft 13b of member 13 is mounted on the distal end of arm 14. The proximal end of arm 14 is rotatably supported against upper frame 18 by support shaft 16. Arm 14 is always biased in a predetermined direction (the direction of arrow A in FIG. 2) by torsion spring 17, thereby urging member 13 toward shaft 4. Thus, shaft 4 is pressed downward with a predetermined force, thereby stabilizing rotation of unit 6.

Arm 14 can be manually rotated against the biasing force of spring 17 in a direction opposite that of arrow A. Member 13 can be detached from the upper end portion of shaft 4. When an operator holds handle 10 and moves it upward, unit 6 can be removed from housing 1, through opening 19 formed in upper frame 18.

Lower press member 12 for holding the lower end portion of shaft 4 is rotatably supported by bearing 21. Support shaft 12b of member 12 is mounted on lower frame 20. Member 12 is rotated by recording medium unit drive motor 28 through a power transmission system. The power transmission system includes gear 25 mounted on member 12, gear 27 mounted on shaft 28a of motor 28, and toothed belt 26 meshed with gears 25 and 27.

Figure 3:
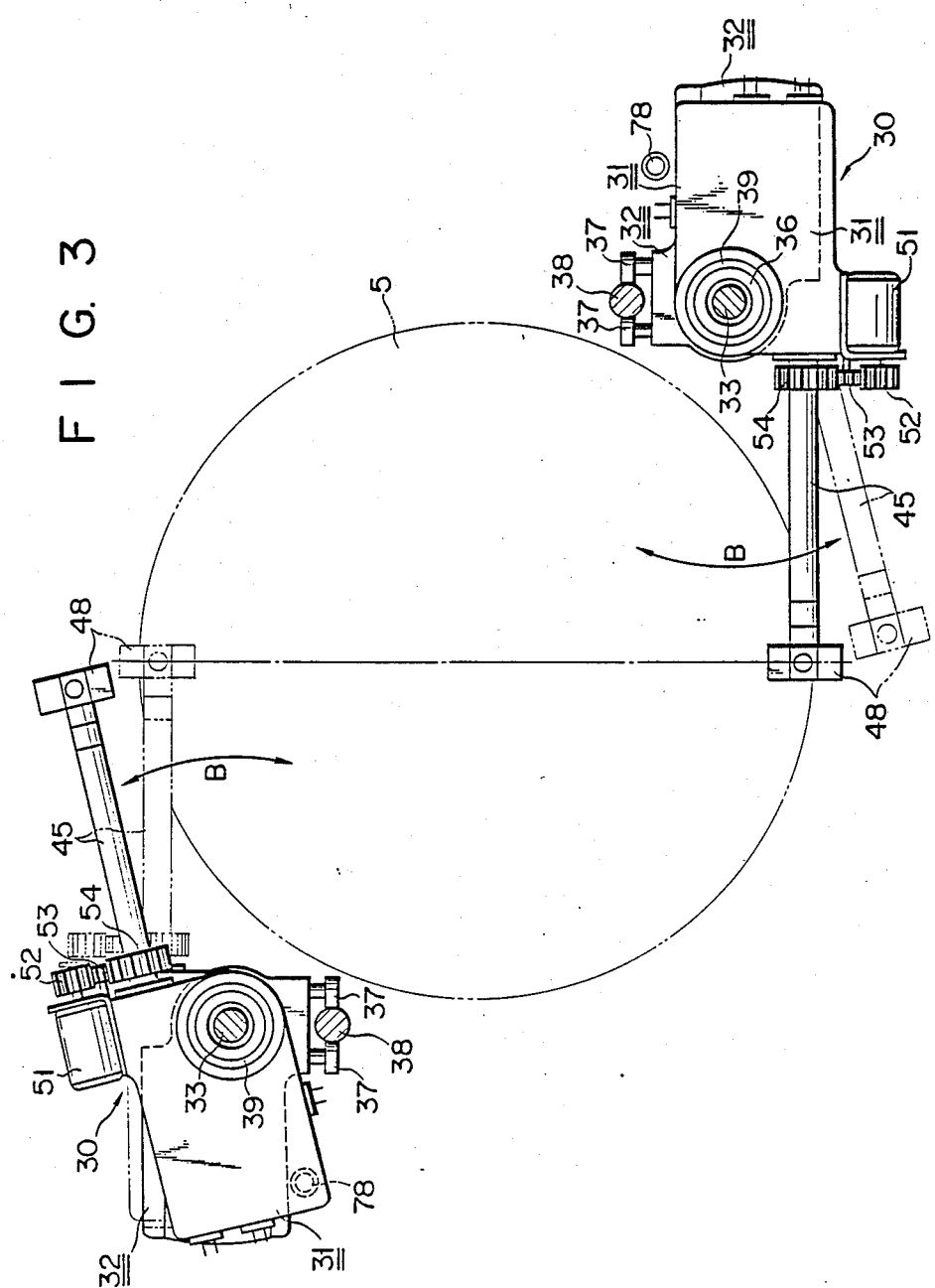
FIG. 3 is a schematic view showing the positional relationship between reader units and an optical disk.

A pair of reader units (information processing units) 30 are located near unit 6 at right and left positions symmetrical, with respect to its rotational center, and located such that shaft 4 is vertically aligned between them, as shown in FIG. 3.

Unit 30 is mounted on carrier member 36 having a hole with a female screw. The female screw is engaged with screw shaft 33, rotatably supported by bearings 34 and 35 mounted on frames 18 and 20. Member 36 is non-rotatably held (to be described later), so that unit 30 is vertically moved upon rotation of shaft 33.

Unit 30 comprises head arm assembly 31 and swing mechanism 32 located below assembly 31 to horizontally swing the mechanism by a predetermined angle. A pair of guide rollers 37, spaced apart from each other by a predetermined distance, are disposed on a side surface of mechanism 32. Guide shaft 38, parallel to shaft 33, is arranged between rollers 37 and put in rolling contact about shaft 33.

Assembly 31 can rotate about carrier member 36 through bearing 39. A head portion of assembly 31 is selectively swung by mechanism 32 between scanning and non-scanning positions in a radial direction, i.e., a direction perpendicular to the axial direction of shaft 4 (the direction of arrow B in FIG. 3). The scanning position is a position where the head portion faces an optical disk, and the non-scanning position is a position where the head portion does not face an optical disk.

Figure 4:
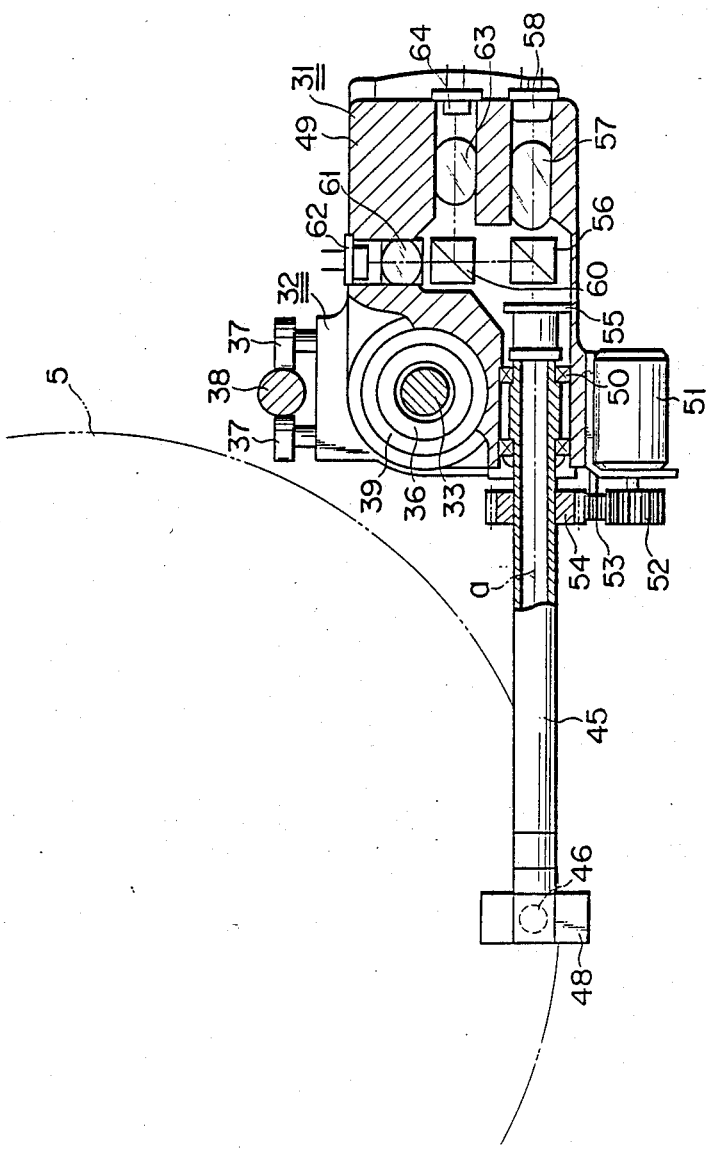
FIG. 4 is a partially cutaway plan view of a reader unit.

Assembly 31 has a construction shown in FIGS. 2 and 4. Head arm 45 having head 48 at its distal end is provided. Head 48 includes prism 47 and objective lens 46 moved vertically by known actuator 48a with respect to head housing 48b. The other end of arm 45 is held by main member 49 mounted on member 36 through bearing 39. The proximal end of arm 45 is rotatable about its axis through bearing 50 mounted on member 49. Driven gear 54 is mounted at an intermediate portion of arm 45, and is interlocked with gear 52 by intermediate gear 53. Gear 52 is mounted on the drive shaft of head arm pivoting motor 51. Upon rotation of motor 51, head 48 can be rotated in the forward or reverse direction through 180 degrees, so that head 48 can face either major surface of disk 5. In this case, the horizontal axis of head arm 45 with head 48 is aligned with the optical path of laser beam a. Therefore, even if head 48 is rotated through 180 degrees, read errors do not occur.

In member 49, λ/4 plate 55, polarizing beam splitter 56, collimator lens 57, and laser oscillator 58 are sequentially arranged in a line extending along the optical path of beam a in arm 45. This optical system guides beam a from oscillator 58 to disk 5. A beam reflected by disk 5 is deflected by splitter 56 by 90 degrees. Half prism 60, projection lens 61 located at the transmission side of prism 60, and photodetector 62 are arranged in the diffraction direction of splitter 56. These optical elements perform information reading and detect a tracking error. Projection lens 63 and photodetector 64 are arranged in a direction of the beam reflected by prism 60, thereby detecting a focusing error.

Figure 5:
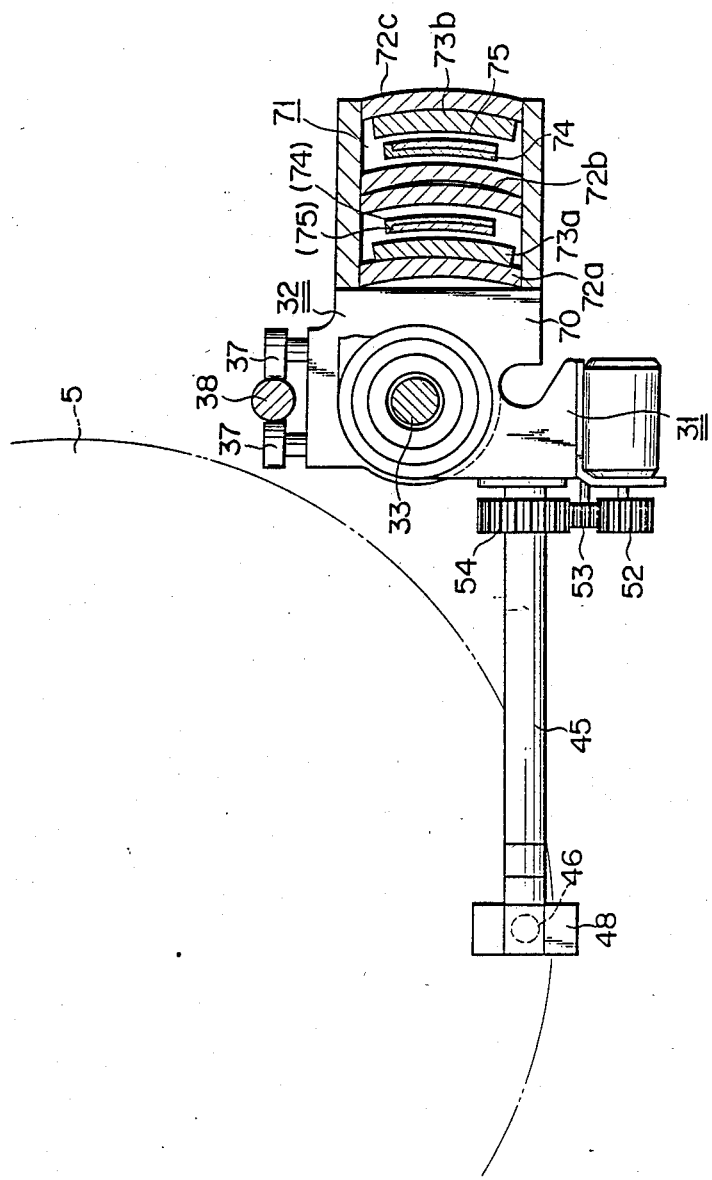
FIG. 5 is a partially cutaway plan view of a head arm assembly swing mechanism in the reader unit.

Swing mechanism 32 includes holder 70, and linear motor mechanism 71 for pivoting assembly 31 held by holder 70 (FIG. 5).

Holder 70 is mounted on member 36 while guide rollers 37 are in rolling contact with shaft 38. Mechanism 71 comprises arcuated yokes 72a, 72b and 72c disposed at predetermined intervals, arcuated magnets 73a and 73b contacting inner surfaces of end yokes 72a and 72c, bobbins 74 loosely engaged with central yoke 72b and suspended from assembly 31, and coils 75 wound around bobbins 74 (FIGS. 2 and 5).

Light-emitting element 77 and light-receiving element 78 are respectively mounted on frames 18 and 20 to oppose each other, such that the track of assembly 31 pivoted by mechanism 32 by the predetermined angle crosses optical axis b of elements 77 and 78. Elements 77 and 78 constitute optical detecting means 79 for detecting if head 48 is removed from disk 5, i.e., if head 48 is located in the non-scanning position (FIGS. 2 and 3). A power source circuit is combined with detecting means 79 such that if head 48 is not located in the non-scanning position, the circuit open (to be described later), thereby preventing collision between head 48 and disk 5.

A drive system for rotating shaft 33 for vertically moving unit 30 has the following arrangement. As shown in FIG. 2, drive gear 81 is mounted on drive shaft 80a of motor 80, and driven gear 83 is mounted at the lower end portion of shaft 33. Toothed belt 82 is interconnected with gears 81, 83. Upon forward or reverse rotation of motor 80 by a predetermined angle in response to a control signal from controller X1 (FIG. 8), shaft 33 is rotated by the corresponding angle, and unit 30 is vertically moved therealong (in a direction of arrow C) for a distance proportionate to the predetermined angle.

The angular displacement of shaft 33 is detected by timing disk 85 and detector 86. Disk 85 is mounted on shaft 33, and detector 86 is mounted on frame 20. Motor 80 is controlled by a detection signal from detector 86, and unit 30 is moved to the predetermined position. When motor 80 is stopped, braking device 87 stops shaft 33, despite the inertia, improving stopping precision.

A rotational angle of unit 6 is detected by timing disk 7 and photodetector 89. Disk 7 is mounted on shaft 4, and photodetector 89 is mounted on frame 20 through holder 88 (FIG. 2).

Reference numeral 90 in FIG. 1 denotes an operation unit arranged at the front edge of cover 2. Reference numerals 91 in FIG. 2 denote guide members for guiding the insertion or removal of unit 6. Members 91 are located at positions so as not to interfere with movement of arms 45.

Figure 6:
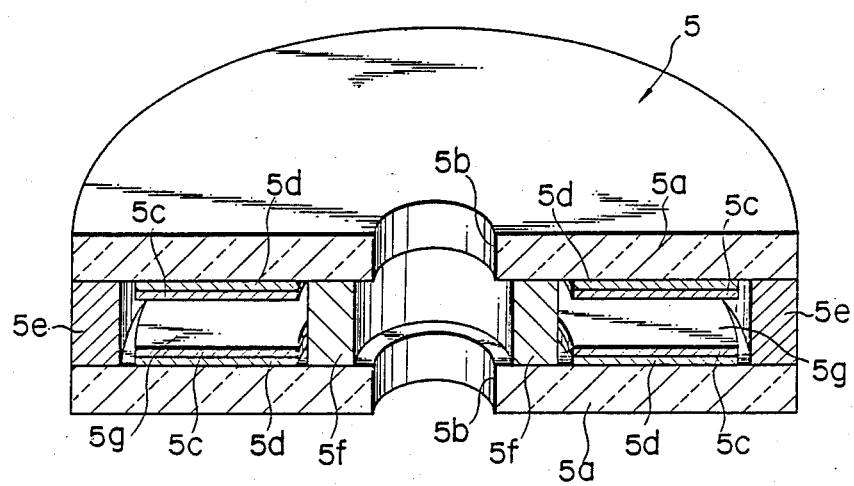
FIG. 6 is a perspective view of the optical disk, showing a section taken along its diameter.

The structure of disks 5 used in the above embodiment will be described with reference to FIG. 6. Each disk 5 includes a pair of substrates 5a made of transparent plastic or the like. Center holes 5b are cut in substrates 5a, and shaft 4 of the image information processing apparatus is fitted in holes 5b. Information forming layers 5c of annular recording or light reflection layers are formed on intermediate protective layers 5d formed on the inner surfaces of substrates 5a.

Annular outer and inner spacers 5e and 5f are concentrically inserted between substrates 5a to oppose layers 5c, thus providing space 5g. Substrates 5a are adhered to each other through spacers 5e and 5f, thus constituting disk 5.

Substrate 5a has a thickness of 0.3 mm or more to prevent read/write errors, even if dust particles are attached to the surface of disk 5. The thickness is preferably less than 5 mm, to allow a focusing lens to more accurately focus a laser beam. Substrate 5a is preferably a 1.0- to 1.5-mm thick transparent acrylic plate, which has a sufficient mechanical strength and is relatively inexpensive.

Figure 7A:
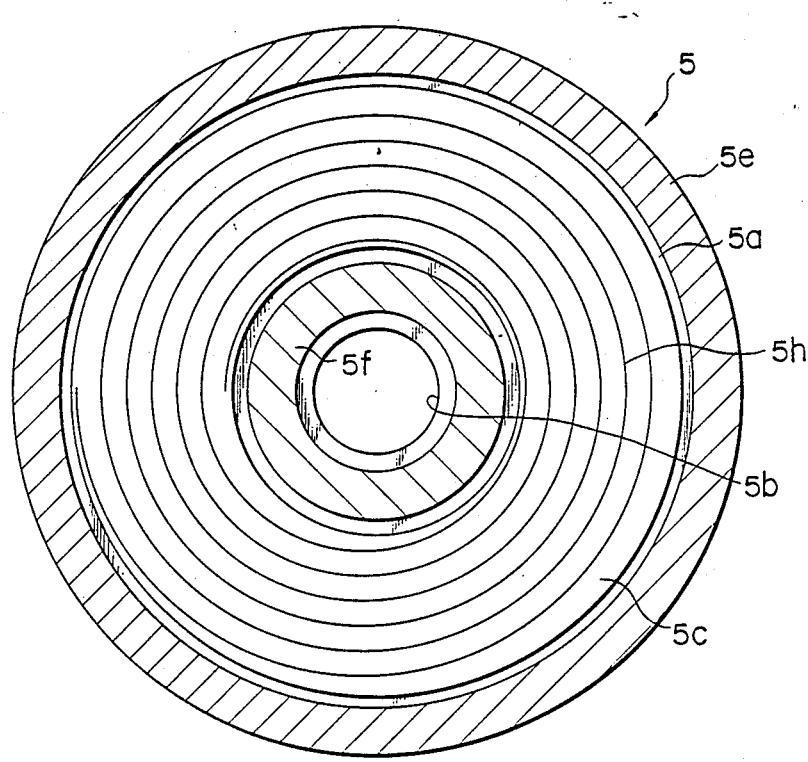
FIGS. 7A and 7B are bottom and top views respectively showing the upper and lower information track layers of the optical disk.
Figure 7B:
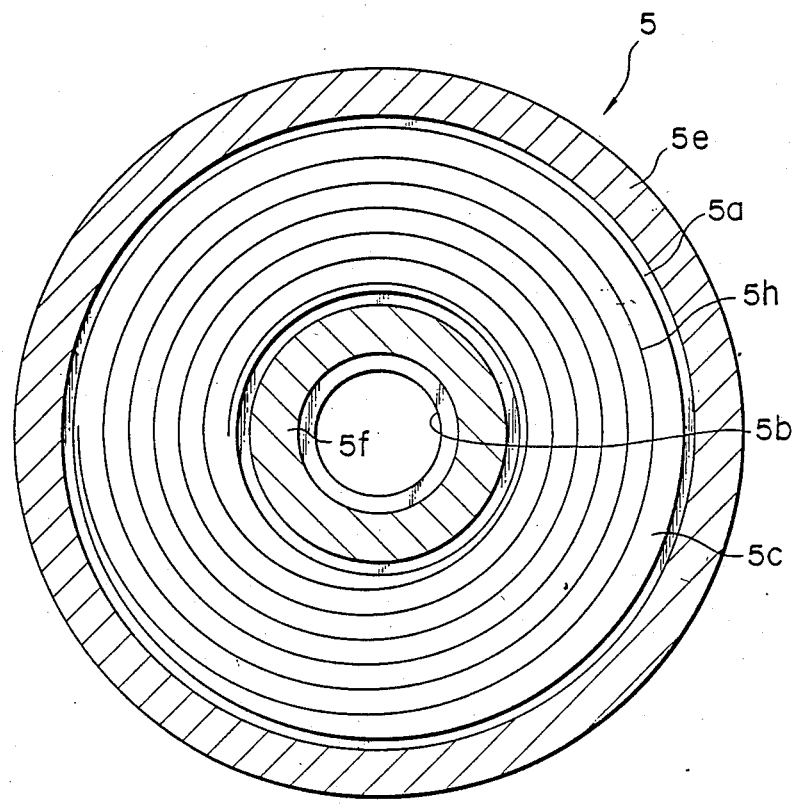

Spiral recording tracks 5h are formed on layers 5c of disk 5. The diameters of tracks 5h gradually increase in the clockwise direction on upper layer 5c, as shown in the bottom view of FIG. 7A. Similarly, the diameters of tracks 5h gradually increase in the clockwise direction on lower layer 5c, as shown in the plan view of FIG. 7B.

When disk 5 is observed from the top, the spiral direction of tracks 5h on upper layer 5c is opposite to that of tracks 5h on lower layer 5c. Since tracks 5h are formed on both major surfaces of single disk 5, tracks 5h on one surface of disk 5 are assigned with track numbers from the inner to the outer tracks, and tracks 5h on the other surface of disk 5 are assigned with track numbers from the outer to the inner tracks. Therefore, a stamper for forming tracks 5h on upper layer 5c can be the same as that for lower layer 5c, thereby decreasing the manufacturing cost of disk 5.

Figure 8:
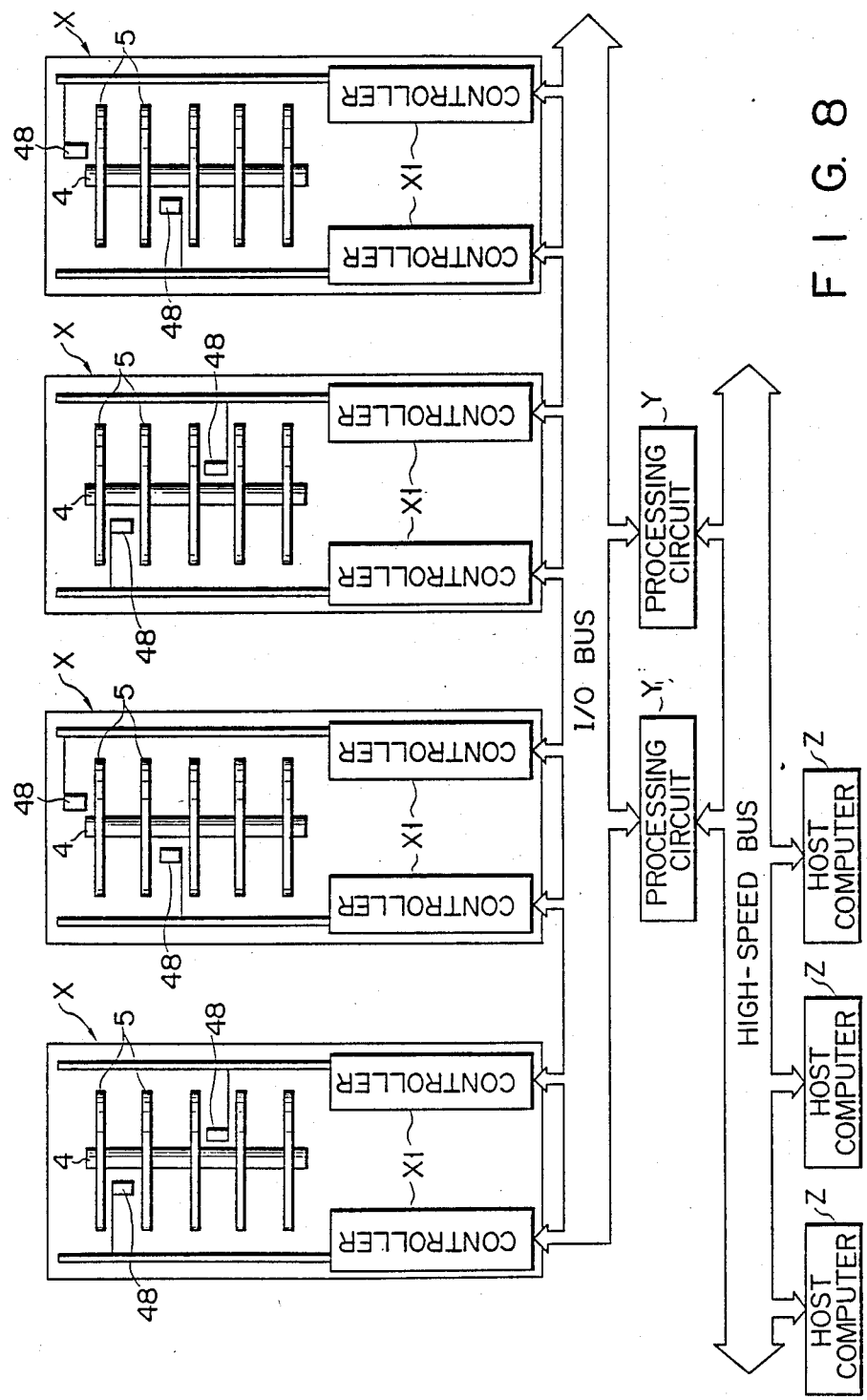
FIG. 8 is a block diagram schematically showing an image information processing system.

As shown in FIG. 8, a plurality of image information processing apparatuses X are arranged in image information processing system. Each apparatus X has controllers X1 for controlling a drive mechanism. The number of processing circuits Y in the system is smaller than the total number of heads 48. In this embodiment, two processing circuits Y are arranged. A plurality of host computers Z are also arranged to control apparatuses X and circuits Y. Thus, apparatuses X, circuits Y and computers Z constitute the image information processing system. Heads 48 can be selected by either circuit Y.

A position detection mechanism for accurately detecting an axial position of unit 30, i.e., accurately keeping a distance between head 48 and disk 5 at a predetermined value, will be described below. The position detection mechanism includes a first detection mechanism for performing coarse detection of the axial position of unit 30, and a second detection mechanism for accurately detecting a distance between disk 5 and objective lens 46 in head 48.

Figure 9:
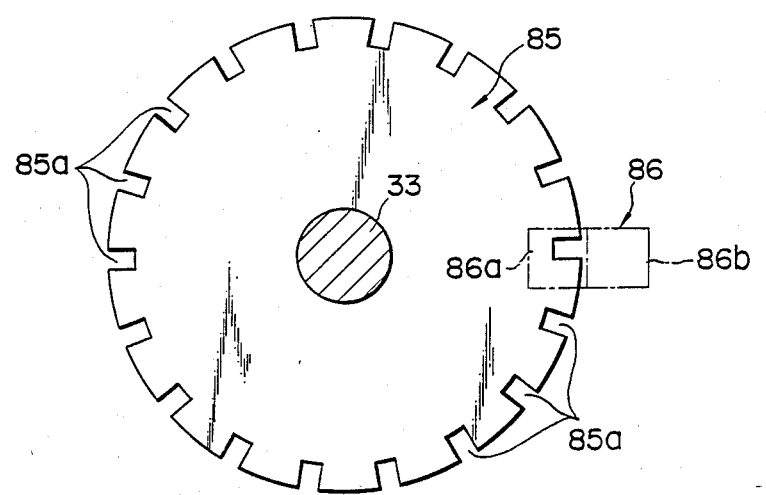
FIG. 9 is a plan view of a timing disk.
Figure 10:
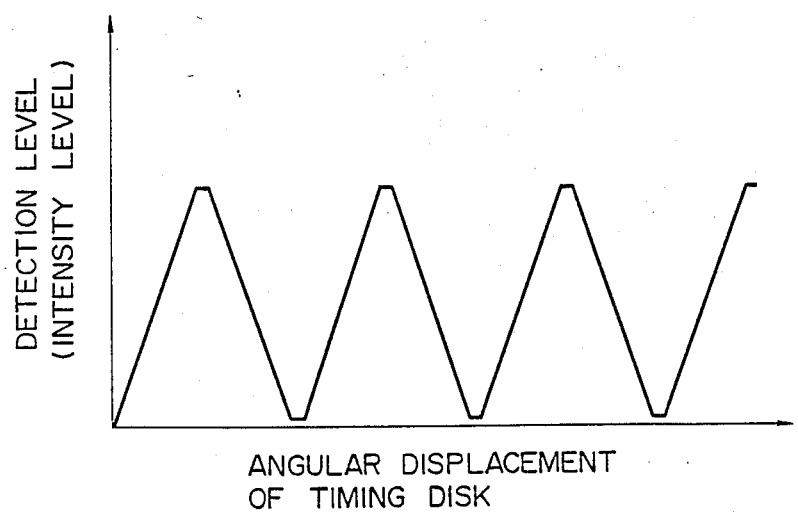
FIG. 10 is a chart showing a change in output from a light-receiving element upon rotation of the timing disk.

The first detection mechanism comprises disk 85 and detector 86, both already described and shown in FIG. 2. As shown in FIG. 9, a large number of slits 85a are formed in the edge of disk 85 at equal angular intervals. Detector 86 comprises light-emitting element 86a and light-receiving element 86b for detecting a beam emitted from element 86a and reflected by a disk edge between slits 85a. The detection level of element 86b upon rotation of disk 85 is given in FIG. 10. Controller X1 counts peaks of detection values to detect a digital angular displacement of disk 85, i.e., to perform coarse detection of the axial position of unit 30. Controller X1 also detects an angular displacement of disk 85, i.e., an analog axial position of unit 30, on the basis of the fact that the level from one peak to another is changed substantially with linearity. In this manner, the coarse detection of the axial position of unit 30 can be performed by the first detection mechanism.

The second detection mechanism for accurately detecting the distance between disk 5 and objective lens 46 in head 48 uses projection lens 63 and photodetector 64, as previously mentioned. In other words, the second detection mechanism uses a so-called focus detection mechanism. A waveform of an output signal from photodetector 64 has a predetermined pattern upon rotation of disk 5, when the first detection mechanism has completed coarse position control. More specifically, there is a first region where focus control is impossible, a third region where focus control can be performed, and a second region between the first and third regions which represents that focus control cannot be currently performed, but will be enabled soon. The three regions are sequentially changed in the order: 1, 2, 3, 2, 1, 2, 3, 2, 1, . . . . upon rotation of disk 5.

Controller X1 checks the waveform of the output signal from photodetector 64, and determines the current distance between disk 5 and head 48 in accordance with the waveform pattern and the relative positional relationship between disk 5 and head 48. Lens 46 is then vertically moved in response to this determination result. Lens 46 in head 48 is moved to an optimal position by the second detection mechanism.

The operation of apparatus X having the above arrangement will be described below.

Upon operation of unit 90, the necessary drive sources are driven, and mechanism 3 is driven. Apparatus X is connected to computer Z, circuit Y, a display device, a printer and the like.

Unit 6, loaded with a plurality of disks 5, is rotated by motor 28 at a predetermined speed.

One unit 30 is moved upward or downward (arrow C in FIG. 2) and stopped at a predetermined position. Assembly 31 in unit 30 is radially moved (the direction of arrow B in FIG. 3) along disk 5, and head 48 in arm 45 reaches a position of predetermined read information. Head 48 then starts reading information.

In this case, the other unit 30 is held in a ready state so as to read information from the next selected disk 5. When read operation of the currently selected disk is completed, second unit 30 starts reading information from a subsequently designated disk.

When layer 5c of currently accessed disk 5 is adjacent to layer 5c of next accessed disk 5, e.g., when information is read from the lower surface of second upper disk 5 and then from the upper surface of third upper disk 5, the same unit 30 is used, and the same arm 45 is rotated through 180 degrees. In order to increase the number of disks 5 stored in unit 6, the distance between adjacent disks can be decreased. In this case, if a height of head 48 is larger than half the distance between two adjacent disks 5, the following operation is required: controller X1 causes mechanism 32 to remove arm 45 from unit 6; and arm 45 removed from disk 5 is then rotated through 180 degrees. Thereafter, arm 45 is re-inserted between the adjacent disks 5.

When unit 6 must be replaced with another for some reason, the operator opens cover 2 and turns arm 14 (in the direction of arrow A in FIG. 2) against a biasing force of torsion spring 17. Next, he or she removes press member 13 from the upper end of shaft 4. The operator then holds handle 10 formed at the upper end of unit 6 and pulls it upward.

In this case, arms 45 of units 30 must be automatically located at positions so as not to interfere the path of disks 5.

The operation of the image information processing system having the plurality of apparatuses X will be described with reference to FIG. 8.

Two processing circuits Y are connected to all units 30. Each circuit Y parallel-controls all units 30.

The system sequentially connects a plurality of host computers Z and two circuits Y in a time-divisional manner. First computer Z outputs an instruction for reading out information of, e.g., track number 1000 and sector number 6 of fifth upper disk 5 in first apparatus X. When first computer Z is connected to first circuit Y, it determines the availability of first circuit Y.

If first circuit Y is available, first computer Z checks the connection state between first apparatus X and first unit 30. If first computer Z determines that first unit 30 is not occupied by second circuit Y and is available, it checks the availability of second unit 30. If first computer Z determines that second unit 30 is also available, it determines which unit 30 is closer to fifth disk 5. The closer unit 30 is then moved to fifth disk 5 to access information. However, if first computer Z determines that second unit 30 is not available, first unit 30 is moved to fifth disk 5 to access information.

When first unit 30 is occupied by second circuit Y, first computer Z checks the availability of second unit 30. If first computer Z determines that second unit 30 is available, second unit 30 is moved to fifth disk 5 to access information. If first computer Z determines that second unit 30 is not available either, it waits until either unit 30 becomes available.

When first computer Z determines that first circuit Y is already occupied, it determines the availability of second circuit Y. If first computer Z determines that second circuit Y is available, it performs the same operation as when first circuit Y is selected. However, if first computer Z determines that second circuit Y is not available, either, it waits until either circuit Y becomes available. In this manner, only two circuits Y can control all units 30 irrespective of the number of apparatuses X.

Since both ends 4a and 4b of shaft 4 of unit 6 are tapered and are respectively fitted in holes 12a and 13a of lower and upper press members 12 and 13, shaft 4 can be rotatably supported. In addition, unit 6 can be easily removed, and alignment of shaft 4 can be automatically performed.

In the above embodiment, five disks 5 are loaded in unit 6. However, any number of disks 5 can be loaded. A case will be described wherein two optical disks 5 are loaded in unit 6, with reference to FIG. 11.

Figure 11:
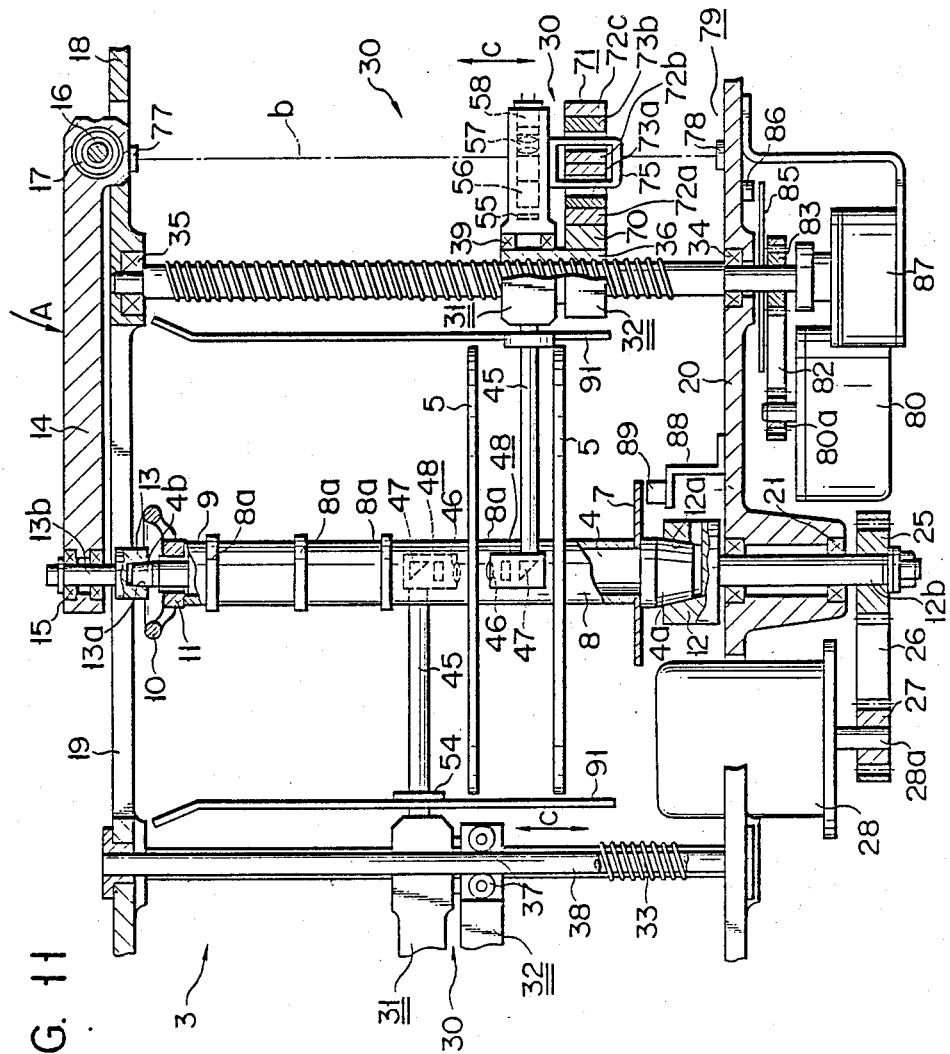
FIG. 11 is a partially sectional side view of the apparatus of FIG. 2, having only two optical disks loaded in it.

Referring to FIG. 11, first disk 5 is placed on lowermost collar 8, second collar 8 is placed on first disk 5, and second disk 5 is placed on second collar 8. Three auxiliary collars 8a, each having the same thickness as a total thickness of collar 8 and disk 5, are placed on second disk 5. Thus, even if unit 6 has only two disks 5, they can be mounted in the same manner as the case wherein five optical disks are mounted in unit 6.

In the above embodiment, a plurality of heads, e.g., two heads, are used for each apparatus X. Two heads 48 are simultaneously used to preformat two disks 5. Thus, a preformatting time can be reduced to half, and apparatus operability can be improved.

According to the image information processing apparatus of the present invention, a bulky device such as an auto changer need not be used. A plurality of optical disks can be handled with only a short waiting time, using a relatively simple, compact arrangement. In addition, optical disks can be easily removed from the apparatus.

What is claimed is:

1. An image information processing apparatus comprising:
    a plurality of optical disks, each having write or read tracks on both surfaces thereof which are spiral patterns winding in directions opposite to each other;
    supporting means having a central axis, for supporting said optical disks subjected to read/write access, at predetermined intervals along the central axis thereof;
    first driving means for rotating said supporting means in one direction and hence the optical disks about the central axis;
    at least one optical unit having an optical head;
    rotating means for rotating the optical head through 180 degrees between the adjacent two optical disks so as to allow scanning of the tracks on the facing surfaces of the adjacent optical disks which are rotated in said one direction immediately after rotating of said optical head through 180 degrees;
    second driving means for moving said optical head along the central axis of said supporting means;
    third driving means for moving said optical head in a radial direction of the optical disk to selectively bring said optical head into a scanning position where an optical disk can be scanned, and into a non-scanning position where the optical disk cannot be scanned; and
    control means for controlling said second and third driving means and rotating means to cause said optical head to face a desired position on a desired one of the plurality of optical disks.

2. An apparatus according to claim 1, wherein said optical unit comprises:
    a head arm assembly for supporting said optical head; and
    a swinging mechanism for pivotally supporting said head arm assembly for movement in a direction perpendicular to the central axis, said swinging mechanism being able to move along the central axis.

3. An apparatus according to claim 2, wherein said third driving means comprises:
    coils arranged in said head arm assembly, said coils being energized to pivot said head arm assembly with respect to said swinging mechanism; and
    yokes corresponding to the coils and arranged in said swinging mechanism.

4. An apparatus according to claim 1, wherein said rotating means comprises:
    an arm supporting the optical head and having a central axis; and
    a rotating mechanism for rotating the arm about its central axis, together with the optical head.

5. An apparatus according to claim 1, wherein said supporting means comprises:
    a drive shaft extending through a central portion of the optical disk and rotatable about the central axis;
    fixing means for detachably mounting the optical disks on said drive shaft at predetermined intervals; and
    seat means for inhibiting vertical movement of said drive shaft.

6. An apparatus according to claim 5, wherein said seat means comprises:
    an upper thrust bearing for receiving an upper end of said drive shaft; and
    a lower thrust bearing for receiving a lower end of said drive shaft.

7. An apparatus according to claim 6, wherein said drive shaft has upper and lower tapered end portions, and said seat means comprises upper and lower press members with tapered recesses for receiving said upper and lower tapered end portions.

8. An apparatus according to claim 7, wherein said tapered upper end portion of said drive shaft is larger than said tapered lower end portion thereof.

9. An apparatus according to claim 7, further comprising:
upper and lower seats for rotatably supporting said upper and lower press members;
a lever for pivotally supporting said upper press member; and
biasing means for biasing said upper press member, and hence said upper press member, toward said drive shaft.

10. An image information processing apparatus comprising:
a plurality of optical disks, each having write or read tracks on both surfaces thereof which are spiral patterns winding in directions opposite to each other;
supporting means having a central axis, for supporting said optical disks subjected to read/write access, at predetermined intervals along the central axis thereof;
first driving means for rotating said supporting means in one direction and hence the optical disks about the central axis;
at least one optical unit having an optical head;
rotating means for rotating the optical head through 180 degrees between the adjacent two optical disks so as to allow scanning of the tracks on the facing surfaces of the adjacent optical disks which are rotated in said one direction;
second driving means for moving said optical head along the central axis of said supporting means;
third driving means for moving said optical head in a radial direction of the optical head in a radial direction of the optical disk to selectively bring said optical head into a scanning position where an optical disk can be scanned, and into a non-scanning position where the optical disk cannot be scanned;
control means for controlling said second and third driving means and rotating means to cause said optical head to face a desired position on a desired one of the plurality of optical disks;
said optical unit comprising,
a head arm assembly for supporting said optical head, and
a swinging mechanism for pivotally supporting said head arm assembly for movement in a direction perpendicular to the central axis, said swinging mechanism being able to move along the central axis; and
said second driving means comprising,
a rotating shaft extending parallel to the central axis and having a male screw portion on a surface thereof;
a first motor for rotating said rotating shaft;
a movable member, having a female screw portion threadably engaged with said male screw portion of said rotating shaft, for pivotally supporting said head arm assembly and fixing said swinging mechanism thereon; and
a rotation preventing member for preventing said swinging mechanism for rotating about said rotating shaft.

11. An apparatus according to claim 10, comprising:
said optical head comprising a head housing fixed on said head arm, and an objective lens movable with respect to said head housing parallel the central axis;
first detecting means for detecting a rotational angle of said rotating shaft, driving said motor and bringing said swinging mechanism to a predetermined position on said rotating shaft; and
second detecting means for measuring a distance between said objective lens and the optical disk and correcting a position of said objective lens relative to the optical disk.

12. An apparatus according to claim 11, wherein said first detecting means comprises:
a timing disk rotatable with said rotating shaft; and
a detector for optically detecting a rotational angle of said timing disk to control said motor.

13. An apparatus according to claim 11, wherein said second detecting means comprises:
a light source for emitting a light beam;
light beam guiding means for guiding the light beam to the optical disk through said objective lens and for guiding a light beam reflected by the optical disk to a measuring position; and
a detector, arranged at the measuring position, for receiving the light beam reflected by the optical disk, detecting a focusing state of said objective lens on the optical disk, moving said objective lens with respect to said head housing in accordance with the focusing state, and correcting the focusing state on the optical disk.

14. An image information processing apparatus comprising:
a plurality of optical disks, each having write or read tracks on both surfaces thereof which are spiral patterns winding in directions opposite to each other;
supporting means having a central axis, for supporting said optical disks subjected to read/write access, at predetermined intervals along the central axis thereof;
first driving means for rotating said supporting means in one direction and hence the optical disks about the central axis;
at least one optical unit having an optical head;
rotating means for rotating the optical head through 180 degrees between the adjacent two optical disks so as to allow scanning of the tracks on the facing surfaces of the adjacent optical disks which are rotated in said one direction;
second driving means for moving said optical head along the central axis of said supporting means;
third driving means for moving said optical head in a radial direction of the optical disk to selectively bring said optical head into a scanning position where an optical disk can be scanned, and into a non-scanning position where the optical disk cannot be scanned;
control means for controlling said second and third driving means and rotating means to cause said optical head to face a desired position on a desired one of the plurality of optical disks;
said supporting means comprising,
a drive shaft extending through a central portion of the optical disk and rotatable about the central axis,
fixing means for detachably mounting the optical disks on said drive shaft at predetermined intervals, and
seat means for inhibiting vertical movement of said drive shaft;
said seat means comprising, an upper thrust bearing for receiving an upper end of said drive shaft, and a lower thrust bearing for receiving a lower end of said drive shaft;

wherein said drive shaft has upper and lower tapered end portions, and said seat means comprises upper and lower press members with tapered recesses for receiving said upper and lower tapered end portions;

upper and lower seats for rotatably supporting said upper and lower press members;

a lever for pivotally supporting said upper press member;

biasing means for biasing said upper press member, and hence said upper press member, toward said drive shaft; and said fixing means comprising, a plurality of collars detachably coaxial with said drive shaft and clamped between each two adjacent ones of the optical disks, an uppermost collar detachably mounted such that a lower end of said uppermost collar abuts against an uppermost one of the optical disks, and a nut threadably engaged with said upper end portion of said drive shaft to fasten said uppermost collar in a direction toward the optical disks, the optical disks being removed by removing said nut and said collars.

15. An image processing system comprising:

a combination of a plurality of image information processing devices for processing information to a plurality of optical disks, and a common processing means;

each processing device including, a plurality of optical disks, each having write or read tracks on both surfaces thereof which are spiral patterns winding in directions opposite to each other, means for detachably supporting the optical disks at predetermined intervals along an axis of the processing device, means for reproducing information from the optical disks, including at least one optical head, head driving means for selectively driving the reproducing means into a scanning position where the optical disks can be scanned, and into a non-scanning position where the optical disks cannot be scanned, and control means for controlling the optical disks and the head driving means to cause the reproducing means to face a desired position of a desired one of the plurality of optical disks; and said processing means connected to the control means of said processing devices to select one of the processing devices to control driving of the reproducing means of the selected process device;

wherein the head driving means comprises, rotating means for rotating the optical head through 180 degrees between the adjacent two optical disks so as to allow scanning of the tracks on the facing surfaces of the adjacent optical disks which are rotated in said one direction immediately after rotating of said optical head through 180 degrees.

* * * * *